US009267619B2

(12) United States Patent
Ono et al.

(10) Patent No.: US 9,267,619 B2
(45) Date of Patent: Feb. 23, 2016

(54) FLUID HANDLING DEVICE AND FLUID HANDLING METHOD

(71) Applicant: Enplas Corporation, Saitama (JP)

(72) Inventors: Koichi Ono, Saitama (JP); Ken Kitamoto, Saitama (JP)

(73) Assignee: Enplas Corporation, Saitama (JP)

( * ) Notice: Subject to any disclaimer, the term of this patent is extended or adjusted under 35 U.S.C. 154(b) by 48 days.

(21) Appl. No.: 14/331,249

(22) Filed: Jul. 15, 2014

(65) Prior Publication Data

US 2015/0021501 A1 Jan. 22, 2015

(30) Foreign Application Priority Data

Jul. 18, 2013 (JP) .................................. 2013-149556

(51) Int. Cl.
*F16K 99/00* (2006.01)
*B01L 3/00* (2006.01)

(52) U.S. Cl.
CPC ....... *F16K 99/0059* (2013.01); *B01L 3/502738* (2013.01); *F16K 99/0015* (2013.01); *B01L 2300/0864* (2013.01); *B01L 2300/0887* (2013.01); *B01L 2400/049* (2013.01); *B01L 2400/0655* (2013.01); *F16K 2099/008* (2013.01); *F16K 2099/0084* (2013.01)

(58) Field of Classification Search
CPC ............ F16K 99/0015; F16K 99/0059; F16K 99/0084; B01L 3/502738; B01L 2400/0638
See application file for complete search history.

(56) References Cited

U.S. PATENT DOCUMENTS

| 7,445,926 | B2 * | 11/2008 | Mathies ............ B01L 3/502738 137/833 |
| 7,607,641 | B1 * | 10/2009 | Yuan ....................... F16K 7/126 137/597 |
| 7,832,429 | B2 * | 11/2010 | Young ............... B01L 3/502738 137/829 |
| 8,499,794 | B2 * | 8/2013 | Takahashi et al. ................. B01L 3/502738 137/829 |
| 8,528,591 | B2 * | 9/2013 | Pirk et al. ............ F16K 99/0059 137/493.8 |
| 2011/0240127 | A1 * | 10/2011 | Eberhart et al. .. B01L 3/502738 137/1 |

FOREIGN PATENT DOCUMENTS

JP 2002-228033 A 8/2002

* cited by examiner

*Primary Examiner* — Eric Keasel
(74) *Attorney, Agent, or Firm* — Brundidge & Stanger, P.C.

(57) ABSTRACT

A micro fluid chip includes a first chip and a second chip. The first chip includes a first substrate having a fluid channel and a partition wall, and a first film made of resin. The second chip includes a second substrate having a recess, and a second film made of elastomer. The second film has an elastic modulus higher than that of the first film. The first chip and the second chip are stacked in such a manner that the partition wall and the recess face each other with the first film and the second film therebetween. By setting the inner side of the recess to a negative pressure, a gap is formed between the first film and the partition wall, and thus a fluid channel is opened.

14 Claims, 11 Drawing Sheets

FLUID HANDLING DEVICE AND FLUID HANDLING METHOD

CROSS REFERENCE TO RELATED APPLICATIONS

This application is entitled and claims the benefit of Japanese Patent Application No. 2013-149556, filed on Jul. 18, 2013, the disclosure of which including the specification, drawings and abstract is incorporated herein by reference in its entirety.

TECHNICAL FIELD

The present invention relates to a fluid handling device for use in analyzing and processing a liquid sample, and a fluid handling method.

BACKGROUND ART

In recent years, microchannel chips have been used to accurately and speedily analyze a small amount of a material such as protein and nucleic acid. Microchannel chips advantageously allow the amount of reagents or samples to be small, and are expected to be used for various uses such as laboratory tests, food tests, and environment tests.

It has been proposed to provide a valve structure in a microchannel chip to automate the process using microchannel chips (see, for example, PTL 1).

PTL 1 discloses a microchannel chip having a micro valve of a diaphragm-valve structure in which a port of a fluid channel is opened and closed by a film. The microchannel chip disclosed in PTL 1 includes a first chip and a second chip. The first chip has a fluid channel, a fluid port that opens at a wall of the channel, and a film that covers the channel and the fluid port. The second chip includes an actuator that pushes the film toward the fluid port of the first chip. When the actuator pushes the film toward the fluid port, the fluid port is closed. On the other hand, when the pushing of the film by the actuator is released, the fluid port is opened. Such opening and closing of the fluid port enable the control of the fluid flowing in the channel. Such a microchannel chip performs various kinds of tests, reactions, and the like while retaining fluid in a predetermined region.

CITATION LIST

Patent Literature

PTL 1
Japanese Patent Application Laid-Open No. 2002-228033

SUMMARY OF INVENTION

Technical Problem

However, in the microchannel chip disclosed in PTL 1, it is necessary that the actuator is kept driven to close the channel so as to retain the fluid in a predetermined region. Consequently, since the actuator has to be kept driven during various kinds of tests, reactions, and the like, the running cost is high. In addition, the fluid undesirably moves in the channel when the actuator is not normally operated, and thus, there is a risk that proper tests and desired reactions cannot be performed.

An object of the present invention is to provide a fluid handling device which can keep a channel closed without requiring an external mechanical force, and a fluid handling method using the fluid handling device.

Solution to Problem

To achieve the above-mentioned object, a fluid handling device of an embodiment of the present invention includes: a first chip and a second chip, the first chip including a first substrate, a first film made of a resin, and a partition wall, the first substrate having a first groove provided in a surface of the first substrate, the first film being bonded on the surface of the first substrate, the partition wall being disposed in a fluid channel defined by the first film and the first groove, the first film having a deflective displaceable region formed at a position corresponding to the partition wall, the second chip including a second substrate and a second film made of elastomer, the second substrate having a recess opening at a surface of the second substrate and a communication path connecting the recess and an outside, the second film being disposed in close contact with the surface of the second substrate in such a manner that the second film seals an opening of the recess opening at the surface, wherein the second film has an elastic modulus higher than an elastic modulus of the first film, the first chip and the second chip are stacked in such a manner that the partition wall and the recess face each other with the first film and the second film therebetween, and that the first film is pressed against the partition wall, and, when an inner side of the recess is set to a negative pressure, the second film is sucked into the recess with the first film bent toward the recess, and a gap is formed between the first film and the partition wall so as to open the fluid channel.

A fluid handling method of an embodiment of the present invention uses the fluid handling device, and includes: stacking the second chip on the first chip having a gap between the first film and the partition wall so as to close the gap introducing fluid in the fluid channel; and setting the inner side of the recess to a negative pressure by sucking air in the recess, wherein when an inner side of the recess is set to a negative pressure, the second film covering the recess is sucked into the recess with the first film bent toward the recess, and a gap is formed between the first film and the partition wall so as to open the fluid channel.

Advantageous Effects of Invention

With the present invention, a fluid handling device which can keep a channel closed without requiring an external mechanical force, and a fluid handling method using the fluid handling device can be provided. The running cost can be reduced by using the fluid handling device according to embodiments of the present invention.

DESCRIPTION OF EMBODIMENTS

In the following, embodiments of the present invention will be described in detail with reference to the accompanying drawings. In the following description, a microchannel chip will be described as a typical example of a fluid handling device of the embodiments of the present invention.

Embodiment 1

Configuration of Microchannel Chip

Figure 1A:
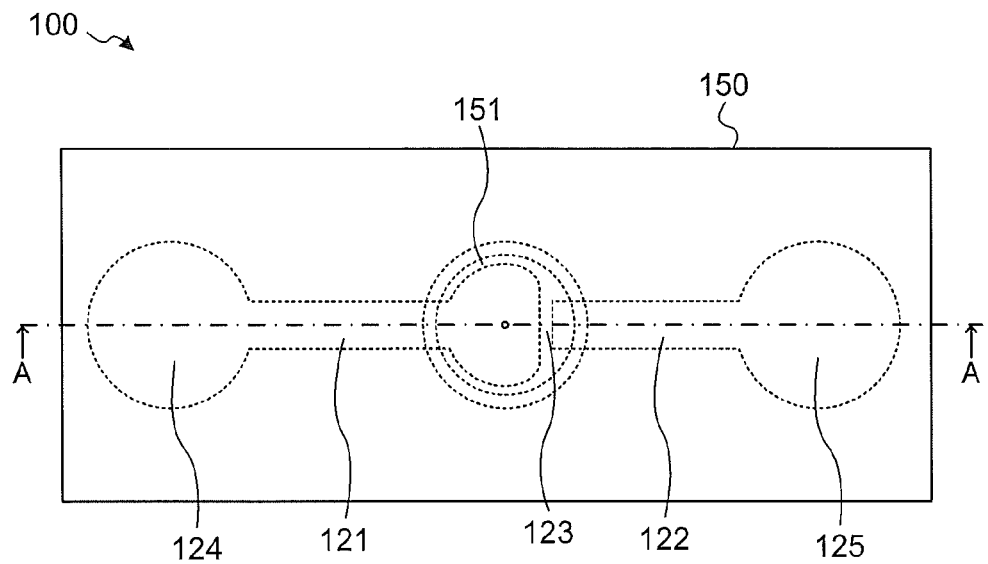
FIGS. 1A and 1B illustrate a configuration of a microchannel chip according to Embodiment 1 of the present invention.
Figure 1B:
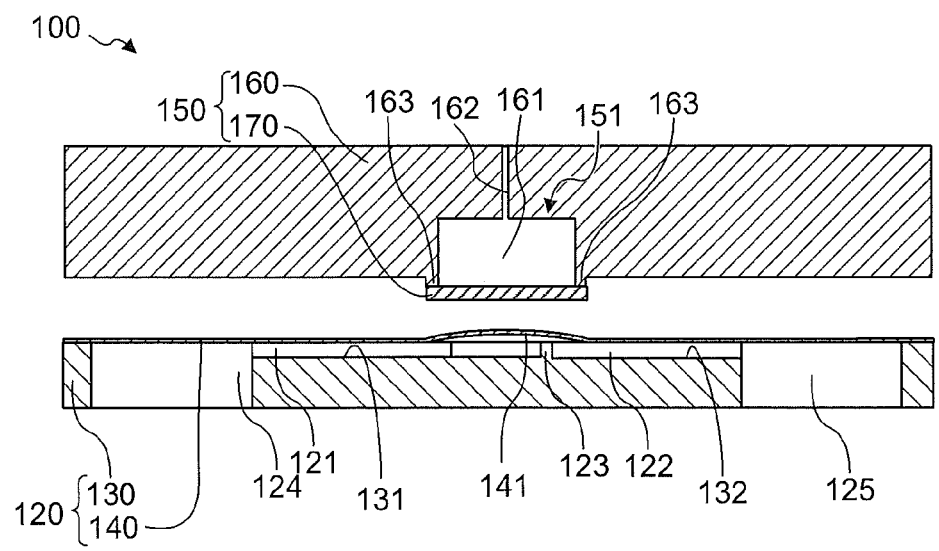

FIGS. 1A and 1B illustrate a configuration of microchannel chip 100 according to Embodiment 1 of the present invention. FIG. 1A is a plan view of microchannel chip 100, and FIG. 1B is a sectional view taken along line A-A of FIG. 1A.

As illustrated in FIGS. 1A and 1B, microchannel chip 100 includes first chip 120 and second chip 150. First chip 120 includes first substrate 130 having partition wall 123, and first film 140, and second chip 150 includes second substrate 160 having recess 161, and second film 170. When in use, first chip 120 and second chip 150 are stacked in such a manner that first film 140 and second film 170 face the inside (see FIG. 3A). At this time, the surface of first film 140 is in close contact with the surface of second film 170. Further, partition wall 123 and recess 161 are disposed in such a manner that they face each other with first film 140 and second film 170 therebetween.

First chip 120 is a chip in which fluid such as reagent and liquid sample flows. A deflective displaceable region is formed at a portion of first film 140 corresponding to partition wall 123 and recess 161 of second chip 150, and this region functions as diaphragm section 141 (valve element) of a micro valve that controls the flow of the fluid in first chip 120. Second chip 150 functions as an actuator of the micro valve.

First chip 120 includes first substrate 130, first film 140, first channel 121, second channel 122, partition wall 123, fluid inlet 124 and fluid outlet 125.

First channel 121 and second channel 122 compose a fluid channel. Partition wall 123 is disposed between first channel 121 and second channel 122. Fluid inlet 124 for introducing liquid and partition wall 123 are disposed at an end and the other end of first channel 121, respectively. In addition, partition wall 123 and fluid outlet 125 from which liquid is taken out are disposed at an end and the other end of second channel 122, respectively. Partition wall 123 and first film 140 connect first channel 121 with second channel 122 when the micro valve is open. At this time, the fluid introduced from fluid inlet 124 flows to fluid outlet 125 through first channel 121 and second channel 122.

The cross-sectional area and cross-sectional form of first channel 121 and second channel 122 are not specifically limited. For example, first channel 121 and second channel 122 are channels in which fluid can move by capillary action. In the present embodiment, the cross-sectional form of first channel 121 and second channel 122 is a substantially rectangular form with a width and depth of about several tens of micrometers. As used herein, the "cross-section of the channel" means the cross-section of the channel orthogonal to the flow direction of the fluid.

Partition wall 123 is disposed between first channel 121 and second channel 122, and functions as the valve seat of the micro valve (which will be described later). The form in plan view and size of partition wall 123 are not specifically limited as long as partition wall 123 can function as the valve seat of the micro valve. In the present embodiment, the size of the channel of partition wall 123 in the cross-sectional direction is the same as that of the cross-sectional form of the fluid channel.

Figure 2A:
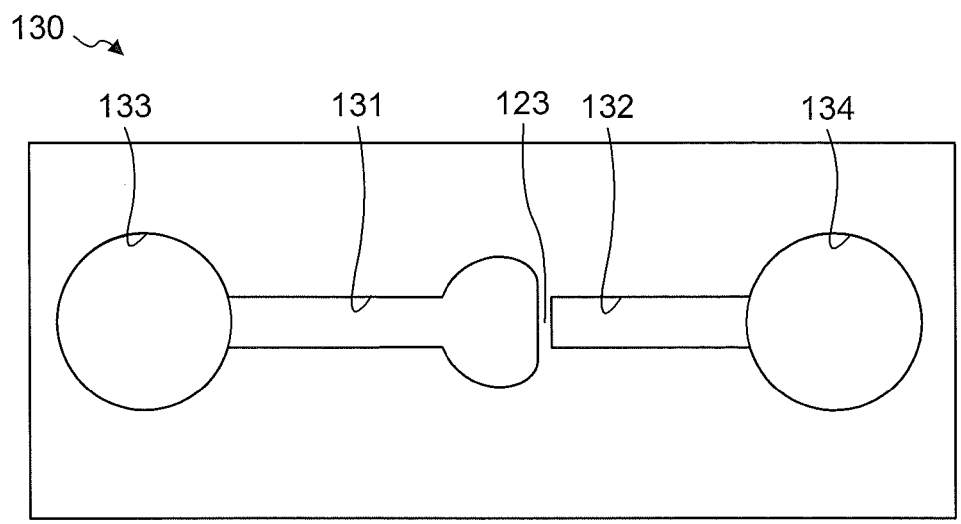
FIGS. 2A and 2B illustrate a configuration of the microchannel chip according to Embodiment 1.

FIG. 2A is a plan view of first substrate 130. As illustrated in FIG. 2A, first substrate 130 is a transparent resin substrate having a substantially rectangular form. The thickness of first substrate 130 is not specifically limited. First substrate 130 has a thickness of 1 to 10 mm for example. In addition, the kind of the resin composing first substrate 130 is not particularly limited, and may be appropriately selected from publicly known resins. Examples of the resin composing first substrate 130 include polyethylene terephthalate, polycarbonate, polymethylmethacrylate, vinyl chloride, polypropylene, polyether, polyethylene, polystyrene, silicone resin, and elastomer.

First substrate 130 includes first groove 131, second groove 132, partition wall 123, first through hole 133 and second through hole 134. An end of first groove 131 is in communication with first through hole 133. In addition, an end of second groove 132 is in communication with second through hole 134. Partition wall 123 is disposed between the other end of first groove 131 and the other end of second groove 132.

The opening part of first groove 131 and the opening part of second groove 132 are sealed with first film 140, and thus first channel 121 and second channel 122 are formed. In addition, an opening part of first through hole 133 and an opening part of second through hole 134 are sealed with first film 140, and thus fluid inlet 124 and fluid outlet 125 are formed (see FIG. 1B).

First film 140 is a transparent resin film having a substantially rectangular form. First film 140 is bonded on a surface of first substrate 130 which faces second chip 150. First film 140 includes diaphragm section 141 (displaceable region) having a substantially hemisphere form. Diaphragm section 141 is disposed at a position corresponding to partition wall 123 in first film 140. First film 140 functions as a valve element (diaphragm) of the micro valve of the diaphragm structure. In the state where first film 140 (diaphragm section 141) is bonded on first substrate 130, first film 140 (diaphragm section 141) is separated from partition wall 123.

The kind of the resin composing first film 140 is not particularly limited as long as first film 140 can function as a valve element (diaphragm), and may be appropriately selected from publicly known resins. Examples of the resin composing first film 140 include polyethylene terephthalate, polycarbonate, polymethylmethacrylate, vinyl chloride, polypropylene, polyether, polyethylene, polystyrene, and silicone resin.

The thickness of first film 140 is not particularly limited as long as first film 140 can function as a valve element (diaphragm), and may be appropriately set in accordance with the kind (stiffness) of the resin. In the present embodiment, first film 140 has a thickness of about 20 µm. In addition, diaphragm section 141 has a size which can cover partition wall 123, and can be housed in pressure chamber 151 when first chip 120 and second chip 150 are stacked. The color of first film 140 is appropriately selected in accordance with the intended use, and the external form of first film 140 is also appropriately designed so as to achieve the required function.

Second chip 150 includes second substrate 160, second film 170, pressure chamber 151 and communication path 162.

The pressure chamber 151 is in communication with the outside. Pressure chamber 151 has a size which can house diaphragm section 141 of first film 140. The form of pressure chamber 151 is not specifically limited. In the present embodiment, the form of pressure chamber 151 is a substantially cylindrical form. In addition, the diameter and depth of pressure chamber 151 are not particularly limited, and may be appropriately set.

Figure 2B:
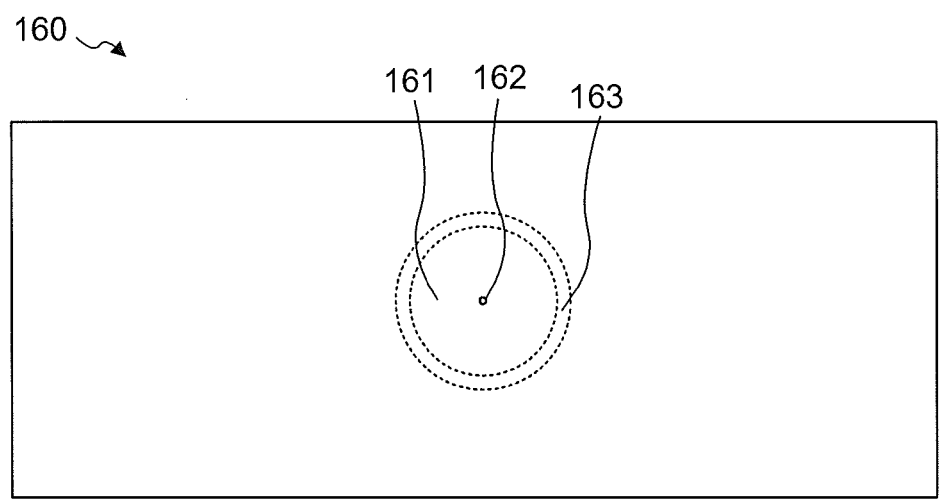

FIG. 2B is a plan view of second substrate 160. As illustrated in FIG. 2B, second substrate 160 is a transparent resin film having a substantially rectangular form. The thickness of second substrate 160 is not specifically limited. In the present embodiment, second substrate 160 has a thickness of 1 mm to 10 mm. The kind of the resin composing second substrate 160 is not particularly limited, and may be appropriately selected from publicly known resins. Examples of the resin composing second substrate 160 are the same as the examples of the resin composing first substrate 130. The color of second substrate 160 is appropriately selected in accordance with the intended use, and the external form of second substrate 160 is appropriately designed so as to achieve the required function.

Second substrate 160 includes recess 161, communication path 162 and joint layer 163. Recess 161 is disposed in second substrate 160 at a position corresponding to diaphragm section 141. The opening part of recess 161 is sealed with second film 170, and thus pressure chamber 151 is formed (see FIG. 1B). Recess 161 is formed with a size which can house diaphragm section 141 of first film 140.

Communication path 162 connects recess 161 with the outside. Communication path 162 is connected with a pressure adjustment device such as a pump. The position of communication path 162 is not specifically limited. In the present embodiment, an opening part of communication path 162 is located at the bottom surface of recess 161, and the other opening part of communication path 162 is located at the surface of second substrate 160 which faces away from the surface on which second film 170 is disposed (see FIG. 1B).

Joint layer 163 is formed integrally with second substrate 160. Joint layer 163 is a protrusion which is formed in second substrate 160 on the surface facing first chip 120, so as to protrude in the direction orthogonal to second substrate 160. In addition, joint layer 163 is disposed in such a manner as to surround the opening part of recess 161. Joint layer 163 has an annular form as viewed in plan. The inner diameter of joint layer 163 is equal to the diameter of recess 161. The inner peripheral surface and outer peripheral surface of joint layer 163 are perpendicular to the surface of first chip 120 which faces second substrate 160. The top surface of joint layer 163 is a planar surface, and the top surface makes close contact with second film 170, thereby forming pressure chamber 151.

Second film 170 is a circular transparent film made of elastomer. Second film 170 is bonded on the surface of second substrate 160 which faces first chip 120. The surface of second film 170 is a flat surface. Second film 170 is disposed on the top surface of joint layer 163 in such a manner as to cover the opening part of recess 161. It is to be noted that second film 170 may be provided all over the surface of second substrate 160 which faces first chip 120. The color of second film 170 is appropriately selected in accordance with the intended use, and the external form is also appropriately designed so as to achieve the required function.

The elastic modulus of second film 170 is higher than that of first film 140. Examples of the elastomer composing second film 170 include silicone rubber. Second film 170 has a thickness of 0.05 to 0.5 mm for example.

Production of Microchannel Chip

First chip 120 is produced in such a manner that first film 140 in which diaphragm section 141 is formed is joined by thermo compression bonding to first substrate 130 in which a predetermined groove and a through hole are formed. At this time, first film 140, and the surface, in which first groove 131 is formed, of first substrate 130 are joined together in such a manner that diaphragm section 141 of first film 140 protrudes toward the outside. It is also possible to form diaphragm section 141 by means of suction or the like after first film 140 is joined to first substrate 130.

Second chip 150 is produced by joining, by thermo compression bonding, second film 170 made of elastomer to second substrate 160 in which the recess is formed. A surface of second film 160, and the surface, in which recess 161 is formed, of second substrate 160 are joined together.

Finally, first chip 120 and second chip 150 are stacked in such a manner that first film 140 and second film 170 face the inside, whereby microchannel chip 100 is produced. At this time, since second film 170 made of elastomer has an elastic modulus higher than that of first film 140 made of a resin, second film 170 is not deformed by diaphragm section 141 of first film 140. Conversely, second film 170 deforms diaphragm section 141 toward first substrate 130 in such a manner that first film 140 makes contact with the top surface of partition wall 123 of first substrate 130. With this structure, when no external mechanical force is applied thereto, microchannel chip 100 can maintain the state where the fluid channel is closed.

In addition, second chip 150 is in contact with first chip 120 only at second film 170. Therefore, at the time of stacking first chip 120 and second chip 150, the stress exerted on second chip 150 concentrates on second film 170. Further, the peripheral portion of second film 170 is joined to the top surface of joint layer 163. Therefore, at the time of stacking first chip 120 and second chip 150, the stress exerted on second chip 150 concentrates on the peripheral portion of second film 170. Thus, when first chip 120 and second chip 150 are stacked, the peripheral portion of second film 170 is pressed against first film 140 by joint layer 163. With this structure, since first film 140 and the top surface of partition wall 123 can be surely brought into contact with each other, microchannel chip 100 can maintain the state where the fluid channel is closed.

Method for Using Microchannel Chip

Figure 3A:
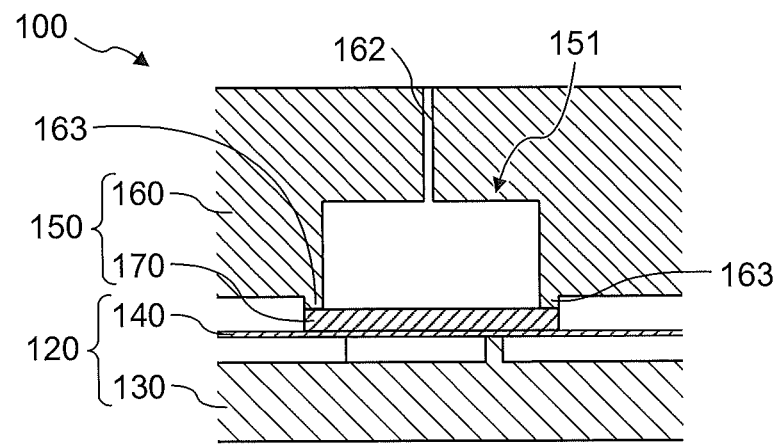
FIGS. 3A and 3B are sectional views for describing a method for using the microchannel chip according to Embodiment 1.
Figure 3B:
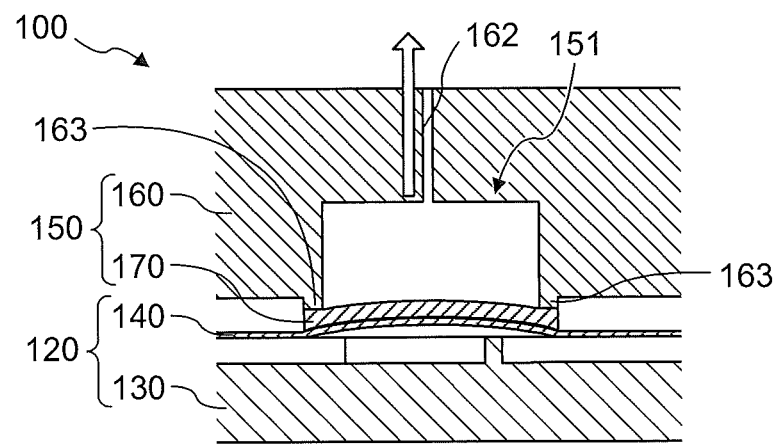

Next, the method for using microchannel chip 100 will be described with reference to FIGS. 3A and 3B. FIGS. 3A and 3B are partially enlarged sectional views of microchannel chip 100 for describing the method for using microchannel chip 100. In the present embodiment, an exemplary case where liquid is used as fluid will be described.

First, first chip 120 and second chip 150 are stacked. At this time, diaphragm section 141 of first film 140 is pressed by second film 170 toward first substrate 130, and first film 140 (diaphragm section 141) and partition wall 123 surely make close contact with each other. Thus, the gap between first film 140 and partition wall 123 is closed, and the valve is brought into a closed state (see FIG. 3A).

Next, liquid is introduced to fluid inlet 124 of first chip 120. At this point of time, the valve is in the closed state, and therefore the liquid is not allowed to enter first channel 121 from fluid inlet 124.

To move the fluid retained in fluid inlet 124 of first chip 120 toward fluid outlet 125, the inner side of pressure chamber 151 is set to a negative pressure by driving the pressure adjustment device connected with pressure chamber 151. Consequently, second film 170 is sucked into recess 161 due to the negative pressure of pressure chamber 151 and first film 140 is bent toward recess 161, forming a gap between first film 140 and partition wall 123. Thus, a fluid channel is opened, and the fluid flows by the capillary action (see FIG. 3B).

In addition, by releasing the negative pressure of the inner side of pressure chamber 151, first film 140 is pressed by second film 170, and first film 140 (diaphragm section 141) and partition wall 123 are surely bought into close contact with each other. Thus, the valve is again brought into the closed state.

With the above-mentioned procedure, it is possible to cause the liquid to flow from first channel 121 to second channel 122, and to stop the flow of the liquid flowing from first channel 121 to second channel 122, at any timing. For example, an operation can be performed in which liquid is reacted with a certain reagent for a predetermined period in fluid inlet 124 and then the liquid in fluid inlet 124 is moved to fluid outlet 125 so as to react the liquid with another reagent in fluid outlet 125.

Modification

While joint layer 163 is integral with second substrate 160 in the above description, joint layer 163 may be integral with second film 170, or may be separated from second substrate 160 and second film 170.

Figure 4A:
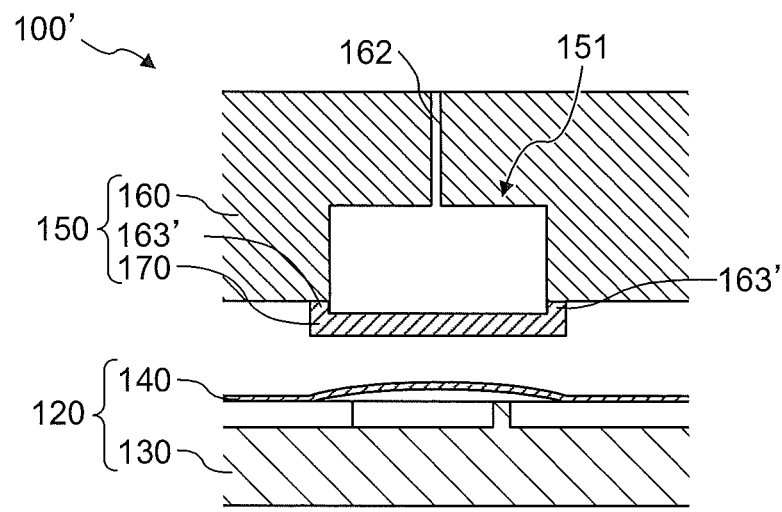
FIGS. 4A and 4B illustrate a configuration of another microchannel chip according to Embodiment 1.
Figure 4B:
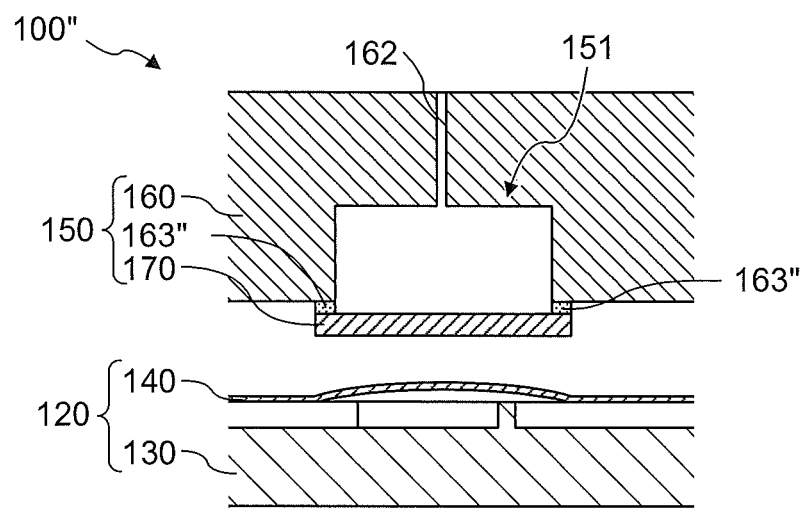

FIG. 4A is a sectional view illustrating a part of microchannel chip 100' according to a first modification of Embodiment 1, and FIG. 4B is a sectional view illustrating a part of microchannel chip 100" according to a second modification of Embodiment 1.

When joint layer 163' is integral with second film 170 as illustrated in FIG. 4A, joint layer 163' is a protrusion which is formed at the peripheral portion of second film 170 as to protrude vertically to second film 170. In this case, the top surface of joint layer 163' is joined to a rim of the opening of recess 161 of second substrate 160.

In addition, when joint layer 163" is separated from second substrate 160 and second film 170 as illustrated in FIG. 4B, joint layer 163" is disposed between second substrate 160 and second film 170. In this case, joint layer 163" air-tightly joins together a rim of the opening of recess 161 of second substrate 160 and the peripheral portion of second film 170. For example, joint layer 163" is an O-ring.

Effect

Since second film 170 has an elastic modulus higher than that of first film 140 in microchannel chips 100, 100' and 100" of the present embodiment, the fluid channel can be closed without the necessity of externally applying a force. In addition, by adjusting the pressure in pressure chamber 151, the flow of the fluid flowing from first channel 121 to second channel 122 can be readily controlled. Further, since the stress is concentrated on joint layer 163 when first chip 120 and second chip 150 are stacked, the fluid channel can be surely closed by pressing second film 170 against first film 140.

While the flow of the fluid in first chip 120 is controlled by adjusting the pressure in pressure chamber 151 in the present embodiment, the control method for the flow of the fluid is not limited to this method. For example, the flow of the fluid may be controlled by using liquid. Examples of the control of the flow of the fluid by using liquid include a method of controlling the pressure in pressure chamber 151 by inputting and outputting the liquid in pressure chamber 151 by using a pump or electroosmotic flow.

Embodiment 2

Configuration of Microchannel Chip

Microchannel chip 200 according to Embodiment 2 of the present invention is different from microchannel chip 100 according to Embodiment 1 in that second substrate 260 is composed of two substrates. Here, the components same as those of microchannel chip 100 according to Embodiment 1 are denoted by the same reference numerals, and the descriptions thereof are omitted. The difference from microchannel chip 100 according to Embodiment 1 will be mainly described.

Figure 5A:
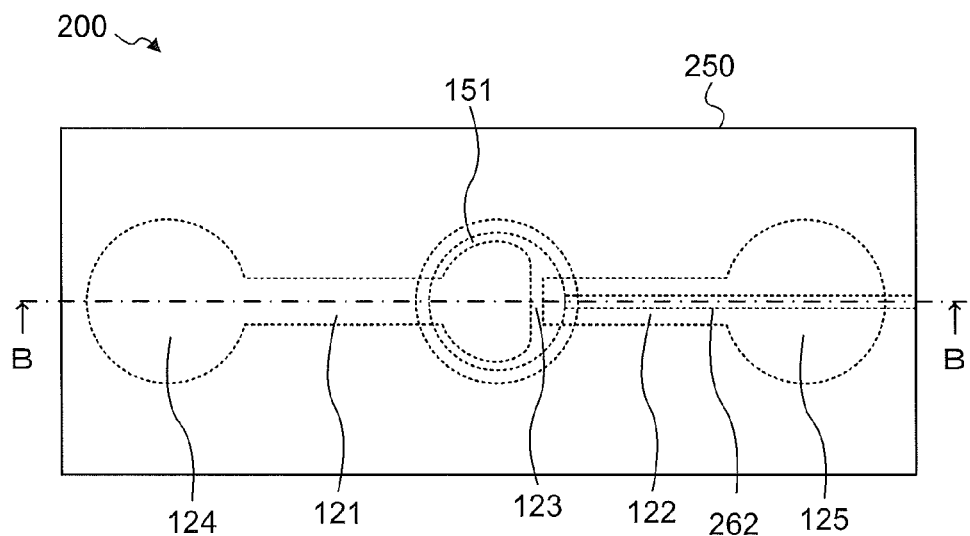
FIGS. 5A and 5B illustrate a configuration of a microchannel chip according to Embodiment 2 of the present invention.
Figure 5B:
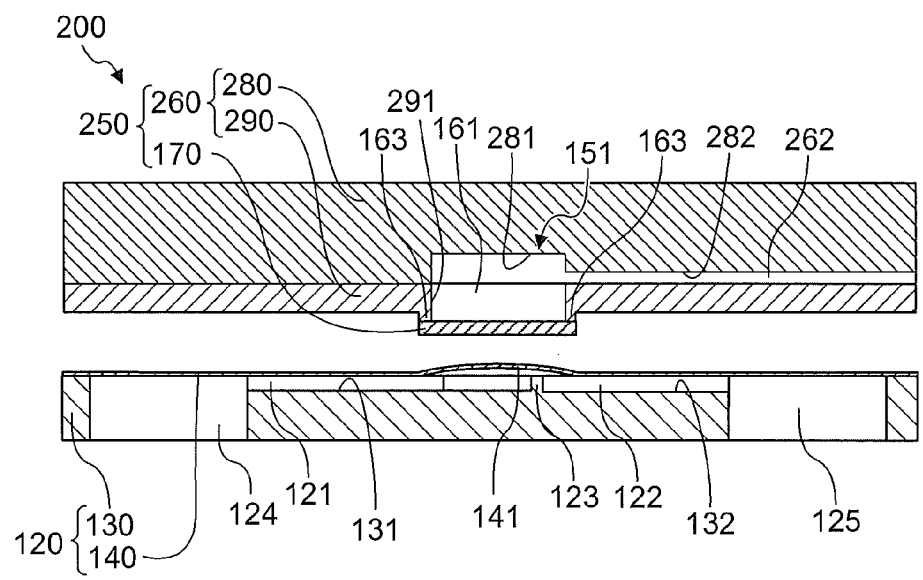

FIGS. 5A to 6B illustrate a configuration of microchannel chip 200 according to Embodiment 2. FIG. 5A is a plan view of microchannel chip 200, and FIG. 5B is a sectional view taken along line B-B of FIG. 5A.

Figure 6A:
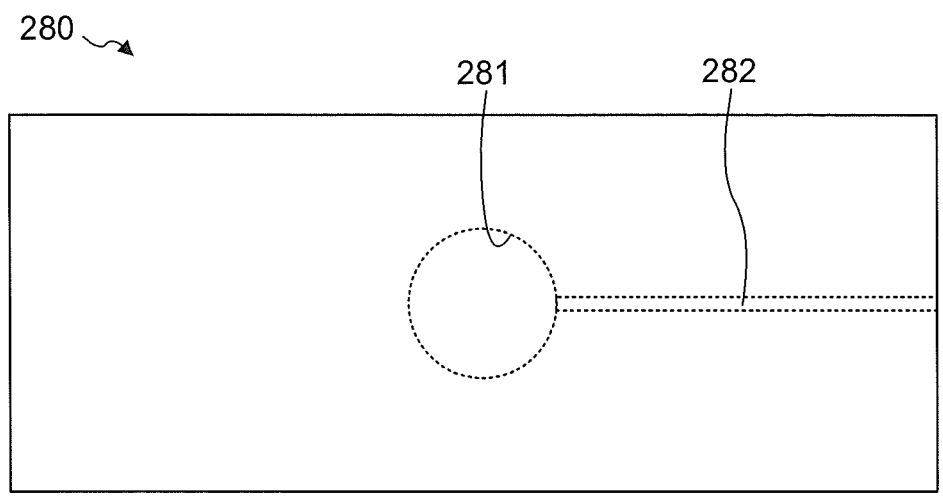
FIGS. 6A and 6B illustrate a configuration of a second substrate of a microchannel chip according to a modification of Embodiment 2.
Figure 6B:
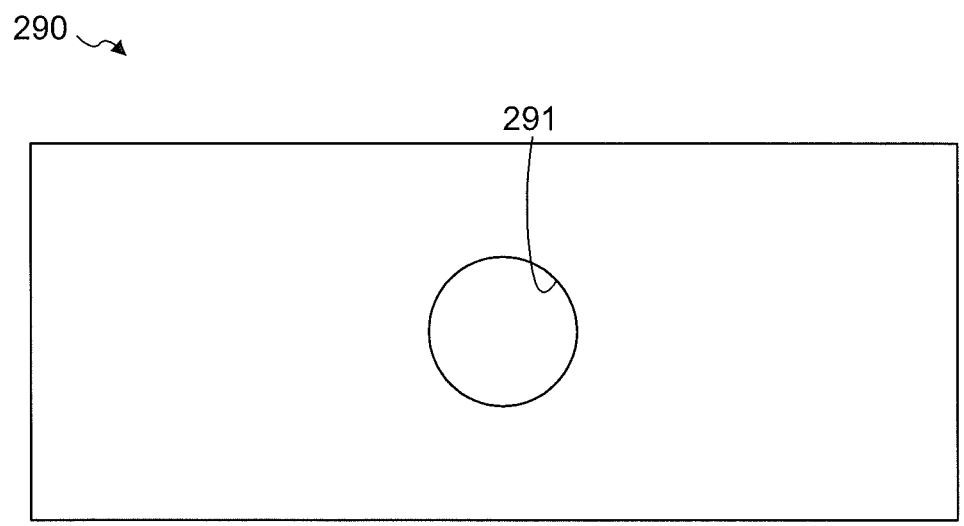

As with microchannel chip 100 according to Embodiment 1, microchannel chip 200 according to Embodiment 2 includes first chip 120 and second chip 250. Unlike second substrate 160 according to Embodiment 1, second substrate 260 of second chip 250 is composed of third substrate 280 and fourth substrate 290. FIG. 6A and FIG. 6B are plan views of third substrate 280 and fourth substrate 290, respectively.

Third substrate 280 is disposed in second substrate 250 on the side which faces away from first chip 120. In the surface of third substrate 280 which faces first chip 120 (the surface on which fourth substrate 290 is stacked), bottom side recess 281 and communication groove 282 connected with bottom side recess 281 are formed. Bottom side recess 281 is a bottom part of recess 161. The form of bottom side recess 281 is not specifically limited. In the present embodiment, bottom side recess 281 has a substantially cylindrical form. In addition, the diameter and depth of bottom side recess 281 are not particularly limited, and may be appropriately set. One end of communication groove 282 is connected with bottom side recess 281, and the other end thereof is open at the side surface of third substrate 280. The opening part of communication groove 282 on the first chip 120 side is sealed with fourth substrate 290, and thus communication groove 282 composes communication path 262.

Fourth substrate 290 is disposed in second substrate 250 on the side which faces first chip 120. Third through hole 291 is formed in fourth substrate 290 at a position corresponding to bottom side recess 281. Third through hole 291 is a bottom part of recess 161. The form of third through hole 291 is not specifically limited. In the present embodiment, third through hole 291 has a substantially cylindrical form. In addition, the diameter and depth of third through hole 291 are also not particularly limited, and may be appropriately set. In the present embodiment, third through hole 291 has a diameter equal to that of bottom side recess 281.

Second substrate 250 can be produced by stacking and joining third substrate 280 and fourth substrate 290 in such a manner that bottom side recess 281 of third substrate 280 and third through hole 291 of fourth substrate 290 overlap. The method for using microchannel chip 200 is the same as in Embodiment 1.

Effect

As described, microchannel chip 200 according to Embodiment 2 has the same effect as that of microchannel chip 100 according to Embodiment 1. In addition, since communication path 262 is formed by stacking third substrate 280 and fourth substrate 290 in microchannel chip 200 according to Embodiment 2, communication path 262 extending along the surface of the substrate can be readily formed.

Embodiment 3

Configuration of Microchannel Chip

Microchannel chip 300 according to Embodiment 3 of the present invention is different from microchannel chip 200 according to Embodiment 2 in that a plurality of partition walls and a plurality of pressure chambers are provided. Here, the components same as those of microchannel chip 200 according to Embodiment 2 are denoted by the same reference numerals, and the descriptions thereof are omitted. The difference from microchannel chip 200 according to Embodiment 2 will be mainly described.

Figure 7A:
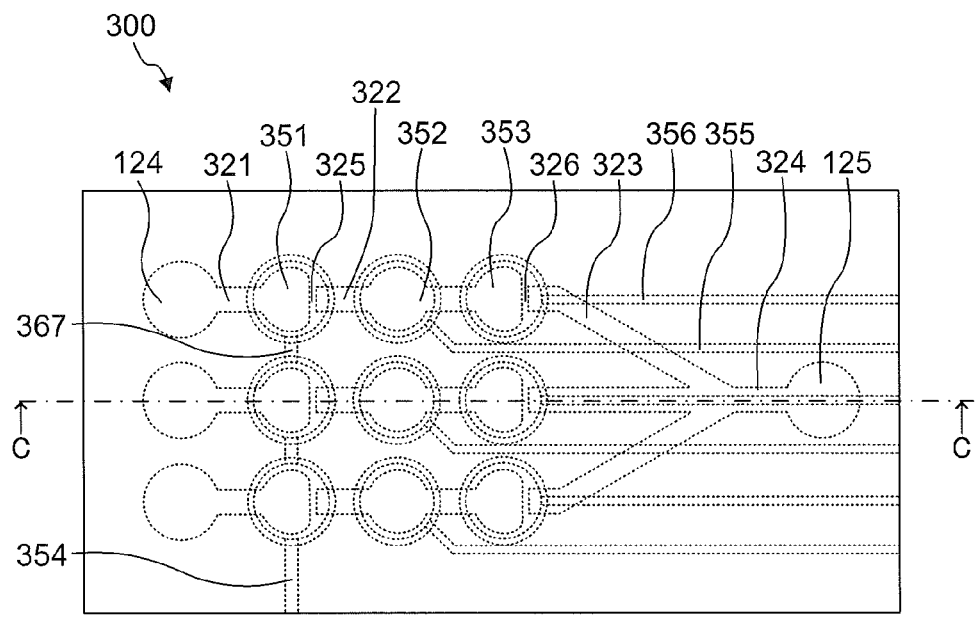
FIGS. 7A and 7B illustrate a configuration of a microchannel chip according to Embodiment 3 of the present invention.
Figure 7B:
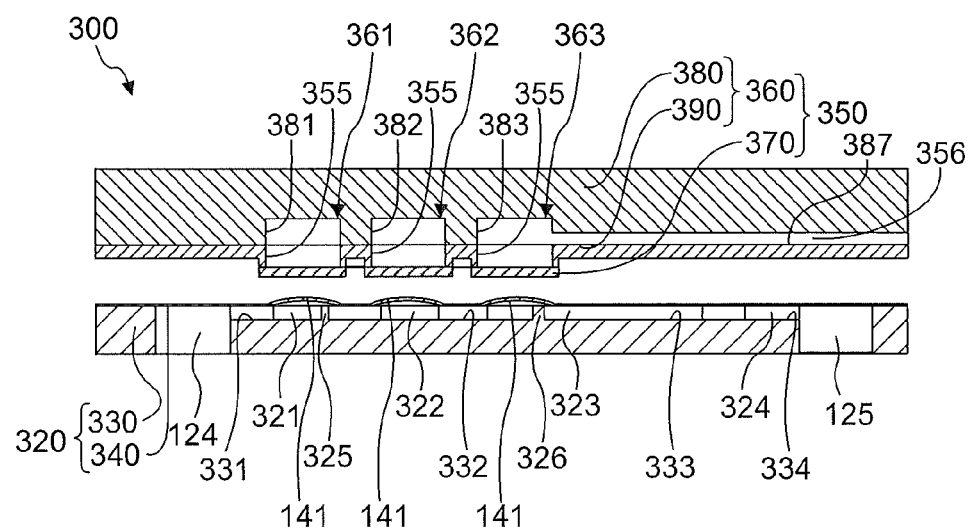

FIGS. 7A and 7B illustrate a configuration of microchannel chip 300 according to Embodiment 3. FIG. 7A is a plan view of microchannel chip 300 according to Embodiment 3, and FIG. 7B is a sectional view taken along line C-C of FIG. 7A.

As illustrated in FIGS. 7A and 7B, microchannel chip 300 according to Embodiment 3 includes first chip 320 and second chip 350.

First chip 320 includes first substrate 330, first film 340, a plurality of third channels 321, a plurality of fourth channels 322, a plurality of fifth channels 323, sixth channel 324, a plurality of first partition walls 325, a plurality of second partition walls 326, fluid inlet 124 and fluid outlet 125.

Third channel 321, fourth channel 322, fifth channel 323 and sixth channel 324 compose fluid channels. First partition wall 325 is disposed between third channel 321 and fourth channel 322, and second partition wall 326 is disposed between fourth channel 322 and fifth channel 323. Fluid inlet 124 is disposed at one end of third channel 321, and first partition wall 325 is disposed at the other end of third channel 321. In addition, first partition wall 325 is disposed at one end of fourth channel 322, and second partition wall 326 is disposed at the other end of fourth channel 322. Further, second partition wall 326 is disposed at one end of fifth channel 323. In addition, the other end of each fifth channel 323 is in communication with one end of sixth channel 324. Fluid outlet 125 from which liquid is taken out is disposed at the other end of sixth channel 324. When the micro valve is closed, first partition wall 325 and first film 340 close third channel 321 and fourth channel 322. In addition, when the micro valve is closed, second partition wall 326 and first film 340 close fourth channel 322 and fifth channel 323.

Figure 8:
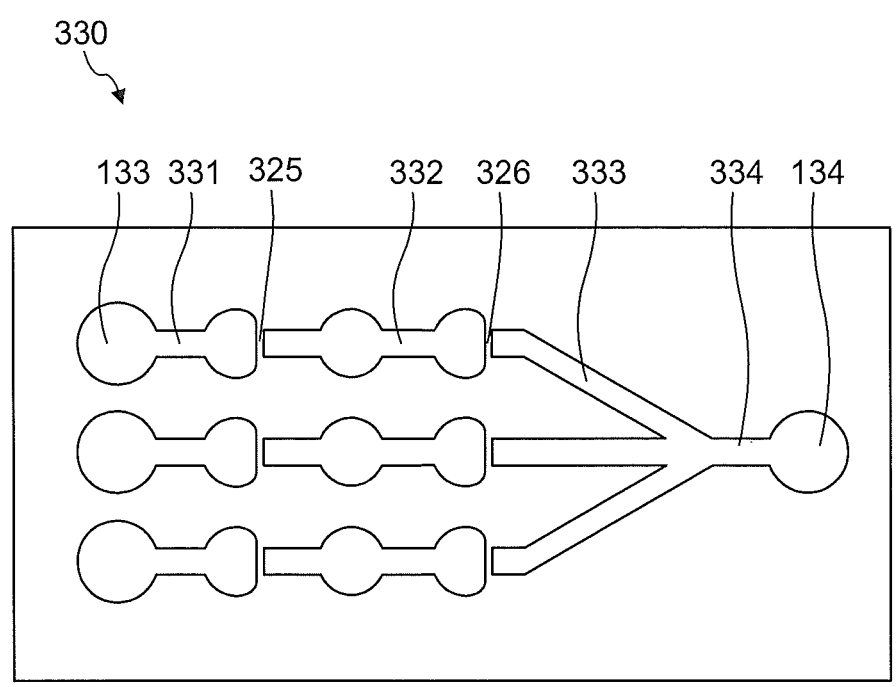
FIG. 8 is a plan view of a first substrate of the microchannel chip according to Embodiment 3.

FIG. 8 is a plan view of first substrate 330. As illustrated in FIG. 8, first substrate 330 includes a plurality of third grooves 331, a plurality of fourth grooves 332, a plurality of fifth grooves 333, sixth groove 334, a plurality of first partition walls 325, a plurality of second partition walls 326, a plurality of first through holes 133 and second through hole 134.

First film 340 includes a plurality of diaphragm sections 141. Diaphragm sections 141 are disposed at positions corresponding to respective recesses. First film 340 is disposed on the surface, on which third substrate 380 is not disposed, of fourth substrate 390.

Second chip 350 includes second substrate 360, second film 370, a plurality of first pressure chambers 351, a plurality of second pressure chambers 352, a plurality of third pressure chambers 353, first communication path 354, a plurality of second communication paths 355, a plurality of third communication paths 356 and a plurality of connection paths 367. Second film 370 is bonded on a surface of second substrate 360.

The numbers of first pressure chambers 351, second pressure chambers 352 and third pressure chambers 353 are not specifically limited. It suffices that the numbers of first pressure chambers 351, second pressure chambers 352 and third pressure chambers 353 are equal to one another. In the present embodiment, the numbers of first pressure chambers 351, second pressure chambers 352 and third pressure chambers 353 are each three.

First communication path 354 connects first pressure chamber 351 with the outside. First communication path 354 may be connected with any of first pressure chambers 351. A pressure adjustment device such as a pump is connected with the opening part on the outside side of first communication path 354. Connection paths 367 each connect adjacent first pressure chambers 351. Since three first pressure chambers 351 are connected in the present embodiment, the number of connection paths 367 is two. In addition, second communication path 355 connects second pressure chamber 352 with the outside. A pressure adjustment device such as a pump is connected with the opening part on the outside of each second communication path 355. In the present embodiment, the number of second communication paths 355 is three as with second pressure chambers 352. Further, third communication path 356 connects the inner side of third pressure chamber 353 with the outside. In the present embodiment, the number of third communication paths 356 is three as with third pressure chambers 353.

Figure 9A:
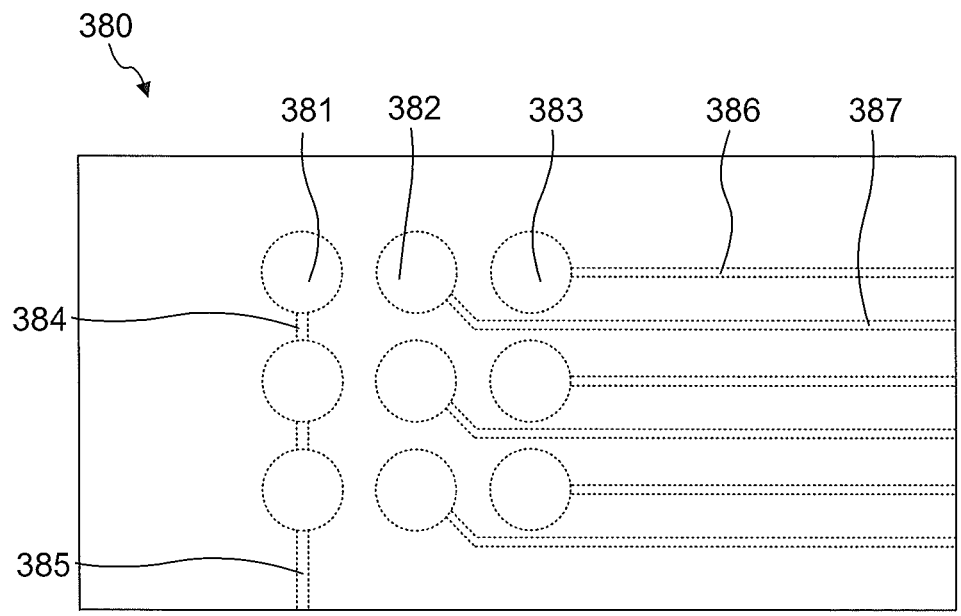
FIGS. 9A and 9B illustrate a configuration of a second substrate of the microchannel chip according to Embodiment 3 of the present invention.
Figure 9B:
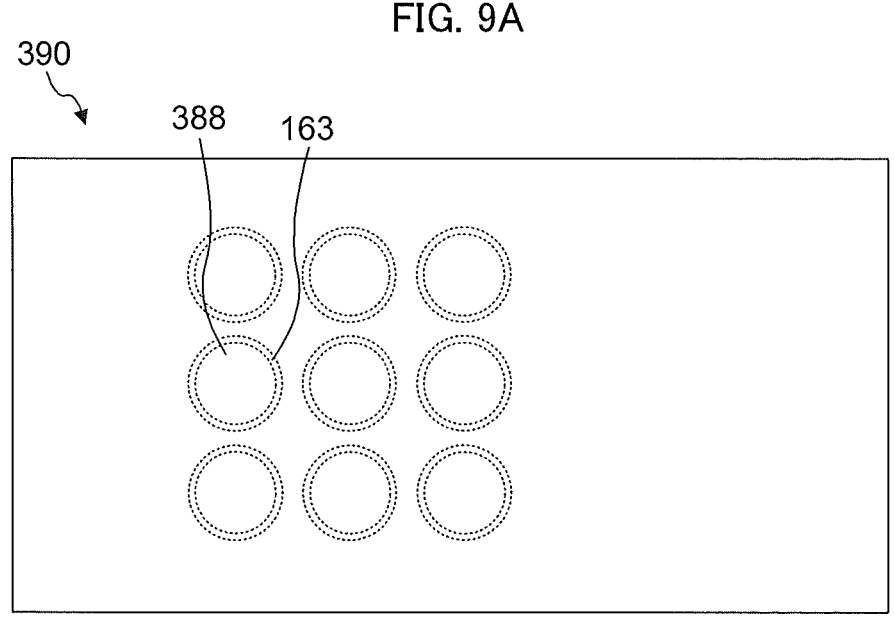
Figure 10A:
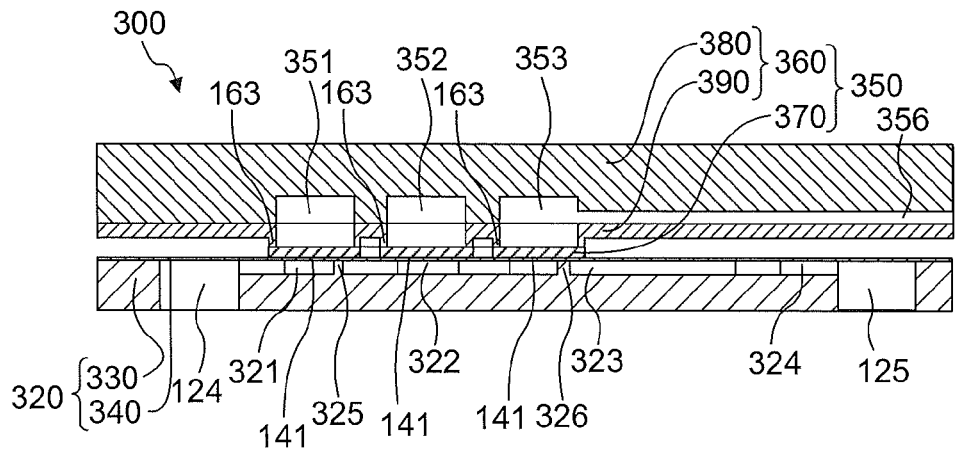
FIGS. 10A to 10C are sectional views for describing a method for using the microchannel chip according to Embodiment 3.
Figure 10B:
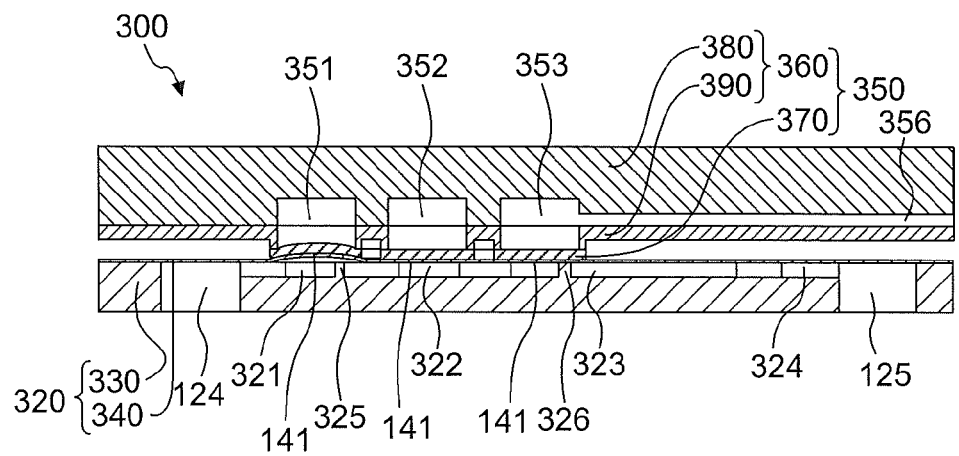
Figure 10C:
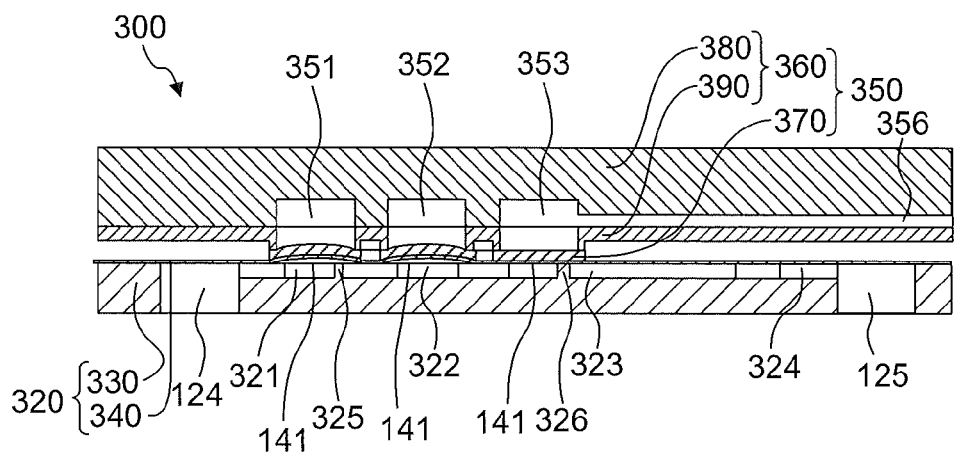

Second substrate 360 is composed of third substrate 380 and fourth substrate 390. FIG. 9A is a plan view of third substrate 380, and FIG. 9B is a plan view of fourth substrate 390. Second substrate 360 is formed by stacking third substrate 380 and fourth substrate 390 (see FIG. 7B).

Third substrate 380 is disposed in second substrate 360 on the side which faces away from first chip 320. In the surface of third substrate 380 which faces first chip 320, a plurality of first bottom side recesses 381, a plurality of second bottom side recesses 382, a plurality of third bottom side recesses 383, a plurality of connection grooves 384, first communication groove 385, a plurality of second communication grooves 386, and third communication groove 387 are formed.

First bottom side recess 381, second bottom side recess 382 and third bottom side recess 383 are bottom parts of recesses 361, 362 and 363, respectively. The form of first bottom side recess 381, second bottom side recess 382 and third bottom side recess 383 is not specifically limited. In the present embodiment, first bottom side recess 381, second bottom side recess 382 and third bottom side recess 383 each have a substantially cylindrical form. In addition, the diameter and depth of first bottom side recess 381, second bottom side recess 382 and third bottom side recess 383 are not specifically limited. In the present embodiment, first bottom side recess 381, second bottom side recess 382 and third bottom side recess 383 have the same the diameter and depth. In addition, the numbers of first bottom side recess 381, second bottom side recess 382 and third bottom side recess 383 are not specifically limited. It suffices that the numbers of first bottom side recesses 381, second bottom side recesses 382 and third bottom side recesses 383 are equal to one another. In the present embodiment, the numbers of first bottom side recesses 381, second bottom side recesses 382 and third bottom side recesses 383 are each three.

Connection groove 384 connects adjacent first bottom side recesses 381. First communication groove 385 connects any one of first bottom side recesses 381 with the outside. One end of first communication groove 385 is connected with first bottom side recess 381, and the other end thereof is open at the side surface of third substrate 380. The opening part of first communication groove 385 is sealed with fourth substrate 390, and thus first communication groove 385 composes first communication path 354.

Second communication groove 386 connects second bottom side recess 382 with the outside. The number of second communication groove 386 is equal to the number of second bottom side recess 382. The opening part of second communication groove 386 is sealed with fourth substrate 390, and thus second communication groove 386 composes second communication path 355.

Third communication groove 387 connects third bottom side recess 383 with the outside. The number of third communication groove 387 is equal to the number of third bottom side recess 383. The opening part of third communication groove 387 is sealed with fourth substrate 390, and thus third communication groove 387 composes third communication path 356.

Fourth substrate 390 is disposed in second substrate 360 on the side which faces first chip 320. In fourth substrate 390, a plurality of fifth through holes 388 are formed at positions corresponding to first bottom side recess 381, second bottom side recess 382 and third bottom side recess 383. The form of fifth through hole 388 is not specifically limited. In the present embodiment, fifth through hole 388 has a substantially cylindrical form. In addition, the diameter and depth of the fifth through holes 388 are not specifically limited. In the present embodiment, fifth through holes 388 have the same diameter and depth.

Second substrate 360 can be produced by stacking and joining third substrate 380 and fourth substrate 390 in such a manner that bottom side recesses 381, 382, and 383 of third substrate 380 overlap respective fifth through holes 388 of fourth substrate 390.

Method for Using Microchannel Chip

Next, the method for using microchannel chip 300 will be described with reference to FIGS. 10A to 11B. FIGS. 10A to 11B are sectional views for describing the method for using microchannel chip 300. In the present embodiment, an exemplary case where liquid is used as fluid will be described.

First, after fluid inlet 124 to fluid outlet 125 are filled with liquid, first chip 320 and second chip 350 are stacked. At this time, a plurality of diaphragm sections 141 of first film 340 are pressed by the center portion of second film 370 and joint layer 163 toward the peripheral portion of second film 370, and thus first film 340 (diaphragm section 141) is surely bought into close contact with first partition wall 325 and second partition wall 326. Thus, the valve is brought into closed state (see FIG. 10A).

To move the liquid to the fluid channel of first chip 320, the inner side of pressure chamber 351 is set to a negative pressure by driving the pressure adjustment device connected with pressure chamber 351. Thus, second film 370 is sucked into first pressure chamber 351, and diaphragm section 141 of first film 340 is bent toward first pressure chamber 351. At this time, the liquid commensurate with the volume increased by the bending of diaphragm section 141 moves from fluid inlet 124 to third channel 321 (see FIG. 10B).

Next, while maintaining the inner side of first pressure chamber 351 at a negative pressure, the inner side of second pressure chamber 352 is set to a negative pressure by driving the pressure adjustment device connected with second pressure chamber 352. Thus, second film 370 is sucked into second pressure chamber 352, and diaphragm section 141 of first film 340 is bent toward second pressure chamber 352. At this time, the liquid commensurate with the volume increased by the bending of diaphragm section 141 moves from third channel 321 beyond first partition wall 325 (see FIG. 10C).

Figure 11A:
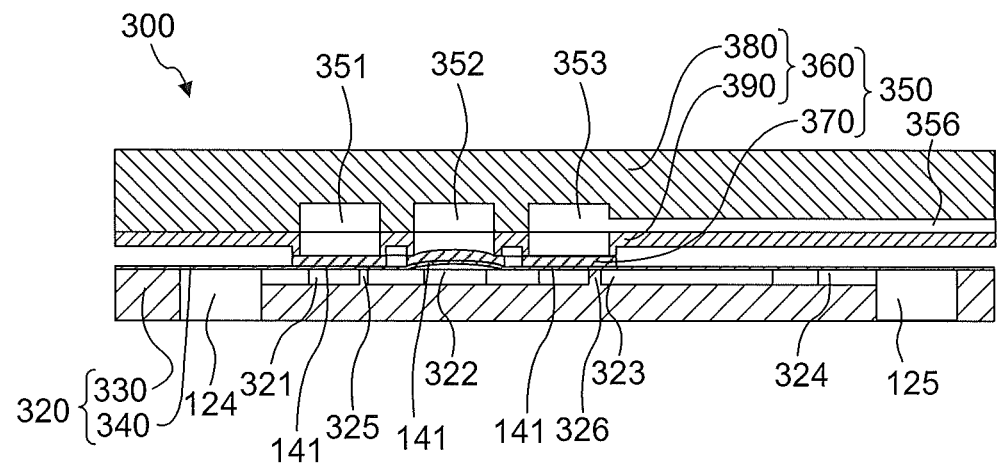
FIGS. 11A and 11B are sectional views for describing the method for using the microchannel chip according to Embodiment 3.
Figure 11B:
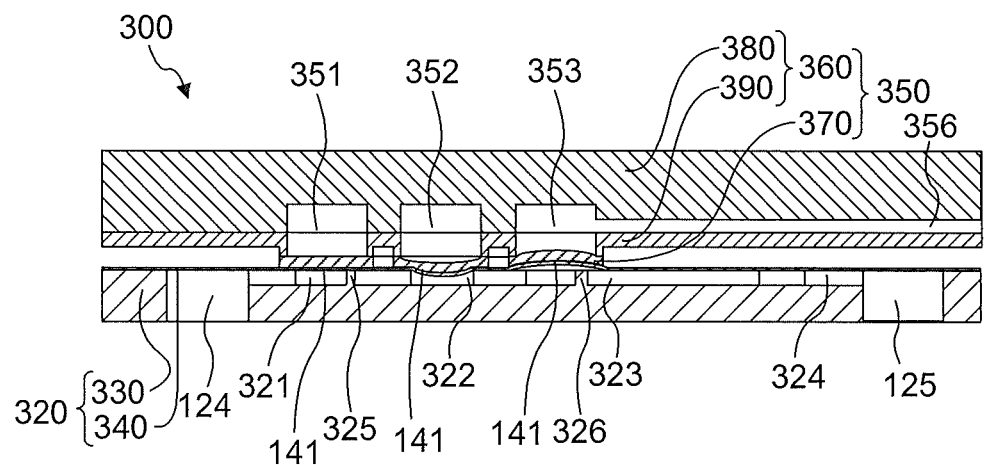

Next, by releasing the pressure in first pressure chamber 351, first film 340 is pressed by second film 370, and first film 340 (diaphragm section 141) and first partition wall 325 are surely bought into close contact with each other (see FIG. 11A).

Finally, the inner side of second pressure chamber 352 is set to a positive pressure while maintaining the inner side of first pressure chamber 351 at a positive pressure so as not to form a gap between first film 340 and first partition wall 325. At this time, third pressure chamber 353 is connected with the outside, and is not at a positive pressure or at a negative pressure. Thus, diaphragm section 141 of first film 340 and second film 370 are pressed into third pressure chamber 353 by the liquid in fourth channel 322. Consequently, a gap is formed between first film 340 and second partition wall 326 and the fluid channel is opened, whereby the liquid moves from fourth channel 322 to fifth channel 323 (see FIG. 11B).

With the above-mentioned procedure, it is possible to cause the liquid to flow from fourth channel 322 to fifth channel 323, and to stop the flow of the liquid flowing from fourth channel 322 to fifth channel 323, at any timing. In addition, the liquid commensurate with the volume increased by the bending of diaphragm section 141 can be sequentially sent to fifth channel 323. That is, a predetermined amount of liquid can be repeatedly sent.

Effect

As described, microchannel chip 300 according to Embodiment 3 can achieve the same effect as microchannel chip 200 according to Embodiment 2. In addition, as described, microchannel chip 300 according to Embodiment 3 can repeatedly sent a predetermined amount of liquid.

INDUSTRIAL APPLICABILITY

The fluid handling device of the embodiments of the present invention is suitable for, for example, microchannel chips used in scientific fields, medical fields and the like.

REFERENCE SIGNS LIST 100, 100', 100", 200, 300 Microchannel chip
120, 320 First chip
121 First channel
122 Second channel
123 Partition wall
124 Fluid inlet
125 Fluid outlet
130, 330 First substrate
131 First groove
132 Second groove
133 First through hole 134 Second through hole
140, 340 First film
141 Diaphragm section
150, 250, 350 Second chip
151 Pressure chamber
160, 260, 360 Second substrate
161, 361, 362, 363 Recess
162, 262 Communication path
163, 163', 163" Joint layer
170, 370 Second film
280, 380 Third substrate
281 Bottom side recess
282 Communication groove
290, 390 Fourth substrate
291 Third through hole
321 Third channel
322 Fourth channel
323 Fifth channel
324 Sixth channel
325 First partition wall
326 Second partition wall
331 Third groove
332 Fourth groove
333 Fifth groove
334 Sixth groove
351 First pressure chamber
352 Second pressure chamber
353 Third pressure chamber
354 First communication path
355 Second communication path
356 Third communication path
367 Connection path
381 First bottom side recess
382 Second bottom side recess
383 Third bottom side recess
384 Connection groove
385 First communication groove
386 Second communication groove
387 Third communication groove
388 Fifth through hole

The invention claimed is:

1. A fluid handling device comprising:
a first chip and a second chip,
the first chip including a first substrate, a first film made of a resin, and a partition wall, the first substrate having a first groove provided in a surface of the first substrate, the first film being bonded on the surface of the first substrate, the partition wall being disposed in a fluid channel defined by the first film and the first groove, the first film having a deflective displaceable region formed at a position corresponding to the partition wall,
the second chip including a second substrate and a second film made of elastomer, the second substrate having a recess opening at a surface of the second substrate and a communication path connecting the recess and an outside, the second film being disposed in close contact with the surface of the second substrate in such a manner that the second film seals an opening of the recess opening at the surface, wherein
the second film has an elastic modulus higher than an elastic modulus of the first film,
the first chip and the second chip are stacked in such a manner that the partition wall and the recess face each other with the first film and the second film therebetween, and that the first film is pressed against the partition wall, and,
when an inner side of the recess is set to a negative pressure, the second film is sucked into the recess with the first film bent toward the recess, and a gap is formed between the first film and the partition wall so as to open the fluid channel.

2. The fluid handling device according to claim 1, wherein the second substrate further includes a joint layer disposed between a rim of the opening of the recess and the second film, the joint layer being configured to allow the second substrate and the second film to make close contact with each other.

3. The fluid handling device according to claim 2, wherein the second substrate includes
a third substrate having a bottom side recess and a communication groove connected with an opening part of the bottom side recess, the bottom side recess and the communication groove being formed in a same surface, and
a fourth substrate stacked on the surface of the third substrate in which the bottom side recess and the communication groove are formed, the fourth substrate having a through hole formed at a position corresponding to the bottom side recess,
the communication path is defined by the communication groove and the fourth substrate,
the recess is defined by the bottom side recess and the through hole, and
the second film is disposed on a surface of the fourth substrate, the surface of the fourth substrate facing away from the third substrate.

4. The fluid handling device according to claim 3, wherein the joint layer is a protrusion formed around the opening of the recess, the protrusion protruding toward the second film side.

5. The fluid handling device according to claim 3, wherein the joint layer is a protrusion formed on a surface of the second film, the surface of the second film being configured to be brought into close contact with the second substrate.

6. The fluid handling device according to claim 3, wherein the joint layer is provided separately from the second substrate and the second film.

7. The fluid handling device according to claim 2, wherein the joint layer is a protrusion formed around the opening of the recess, the protrusion protruding toward the second film side.

8. The fluid handling device according to claim 2, wherein the joint layer is a protrusion formed on a surface of the second film, the surface of the second film being configured to be brought into close contact with the second substrate.

9. The fluid handling device according to claim 2, wherein the joint layer is provided separately from the second substrate and the second film.

10. The fluid handling device according to claim 1, wherein the second substrate includes
a third substrate having a bottom side recess and a communication groove connected with an opening part of the bottom side recess, the bottom side recess and the communication groove being formed in a same surface, and
a fourth substrate stacked on the surface of the third substrate in which the bottom side recess and the communication groove are formed, the fourth substrate having a through hole formed at a position corresponding to the bottom side recess,
the communication path is defined by the communication groove and the fourth substrate, the recess is defined by the bottom side recess and the through hole, and the second film is disposed on a surface of the fourth substrate, the surface of the fourth substrate facing away from the third substrate.

11. The fluid handling device according to claim 10, wherein the joint layer is a protrusion formed around the opening of the recess, the protrusion protruding toward the second film side.

12. The fluid handling device according to claim 10, wherein the joint layer is a protrusion formed on a surface of the second film, the surface of the second film being configured to be brought into close contact with the second substrate.

13. The fluid handling device according to claim 10, wherein the joint layer is provided separately from the second substrate and the second film.

14. A fluid handling method which uses the fluid handling device according to claim 1, the method comprising:

stacking the second chip on the first chip having a gap between the first film and the partition wall so as to close the gap;

introducing fluid in the fluid channel; and setting the inner side of the recess to a negative pressure by sucking air in the recess, wherein when an inner side of the recess is set to a negative pressure, the second film covering the recess is sucked into the recess with the first film bent toward the recess, and a gap is formed between the first film and the partition wall so as to open the fluid channel.

* * * * *